United States Patent
Shim et al.

(10) Patent No.: US 10,473,845 B2
(45) Date of Patent: Nov. 12, 2019

(54) DIRECTIONAL BACKLIGHT UNIT, THREE-DIMENSIONAL IMAGE DISPLAY APPARATUS HAVING THE SAME, AND METHOD OF MANUFACTURING THE SAME

(71) Applicant: SAMSUNG ELECTRONICS CO., LTD., Suwon-si (KR)

(72) Inventors: Dongsik Shim, Hwaseong-si (KR); Bongsu Shin, Seoul (KR); Dongouk Kim, Pyeongtaek-si (KR); Joonyong Park, Suwon-si (KR); Jihyun Bae, Seoul (KR); Sunghoon Lee, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/687,013

(22) Filed: Aug. 25, 2017

(65) Prior Publication Data
US 2018/0149799 A1    May 31, 2018

(30) Foreign Application Priority Data
Nov. 25, 2016    (KR) .................... 10-2016-0158493

(51) Int. Cl.
*G02B 5/18* (2006.01)
*F21V 8/00* (2006.01)
*G02B 27/22* (2018.01)

(52) U.S. Cl.
CPC .......... *G02B 6/0055* (2013.01); *G02B 6/003* (2013.01); *G02B 6/005* (2013.01); *G02B 6/0031* (2013.01); *G02B 6/0065* (2013.01); *G02B 27/22* (2013.01)

(58) Field of Classification Search
USPC ........................................................ 362/607
See application file for complete search history.

(56) References Cited

U.S. PATENT DOCUMENTS

| | | | |
|---|---|---|---|
| 2004/0042233 A1 | 3/2004 | Suzuki et al. | |
| 2010/0073599 A1 | 3/2010 | Yoon et al. | |
| 2014/0300840 A1 | 10/2014 | Fattal et al. | |
| 2015/0036068 A1* | 2/2015 | Fattal ................... | G02B 6/0036 349/15 |
| 2015/0331170 A1 | 11/2015 | Cheng et al. | |

FOREIGN PATENT DOCUMENTS

| | | |
|---|---|---|
| KR | 1020080052775 A | 6/2008 |
| KR | 101641375 B1 | 7/2016 |

OTHER PUBLICATIONS

Communication dated Apr. 24, 2018, issued by the European Patent Office in counterpart European application No. 17194177.6.

* cited by examiner

*Primary Examiner* — Rafferty D Kelly
(74) *Attorney, Agent, or Firm* — Sughrue Mion, PLLC (57) ABSTRACT

There are provided a backlight unit, a 3D image display apparatus, and a method of manufacturing the same. The backlight unit may include a light source, a light guide plate that guides light irradiated from the light source, and including an exit surface through which the light exits, and a reflection plate provided on at least a part of the exit surface of the light guide plate.

25 Claims, 9 Drawing Sheets

DIRECTIONAL BACKLIGHT UNIT, THREE-DIMENSIONAL IMAGE DISPLAY APPARATUS HAVING THE SAME, AND METHOD OF MANUFACTURING THE SAME

CROSS-REFERENCE TO RELATED APPLICATION

This application claims priority from Korean Patent Application No. 10-2016-0158493, filed on Nov. 25, 2016, in the Korean Intellectual Property Office, the disclosure of which is incorporated herein in its entirety by reference.

BACKGROUND

1. Field

The present disclosure relates to directional backlight units, three-dimensional (3D) image display apparatuses having the same, and methods of manufacturing the same.

2. Description of the Related Art

Recently, three-dimensional (3D) movies have become popular and thus research is being actively conducted on 3D image display apparatuses. The 3D image display apparatuses display 3D images based on binocular parallax. Related art, commercialized 3D image display apparatuses use binocular parallax and give a three-dimensional effect to a user by providing a left-view image and a right-view image to the left eye and the right eye of the user, respectively. The above-described 3D image display apparatuses include stereoscopic 3D image display apparatuses which require special glasses, and autostereoscopic 3D image display apparatuses which require no glasses.

The stereoscopic 3D image display apparatuses use red-green glasses in theaters, and use polarized glasses or liquid crystal shutters for televisions. The autostereoscopic 3D image display apparatuses are divided into a barrier type, a lenticular type, etc., based on structures thereof. Also, the autostereoscopic 3D image display apparatuses are divided into a multiview rendering type, a volumetric type for recording every data in a 3D space and displaying the same in voxels, an integral imaging type for capturing multi-angle images formed through a fly's eye collimator and reversely displaying the same, a holographic type, a directional backlight unit type, etc., based on image display schemes thereof.

A directional backlight unit may display a 3D image by adjusting an exit direction of light by using gratings. When light proceeds in a light guide plate due to total reflection, the light leaks between the light guide plate and a display panel and thus the intensity of the light is reduced.

SUMMARY

In this disclosure, various exemplary embodiments including, but not limited to, directional backlight units capable of reducing light leakage, three-dimensional (3D) image display apparatuses having directional backlight units capable of reducing light leakage and methods of manufacturing 3D image display apparatuses having directional backlight units capable of reducing light leakage, are provided.

Additional aspects will be set forth in part in the description which follows and, in part, will be apparent from the description, or may be learned by practice of the exemplary embodiments.

According to an exemplary embodiment, there is provided a backlight unit comprising: a light source, a light guide plate configured to guide light irradiated from the light source, and comprising an exit surface through which the light exits and a reflection plate provided on at least a part of the exit surface of the light guide plate.

The backlight unit may further comprise a diffractor provided on the exit surface of the light guide plate.

The diffractor may have an area that is less than an area of the exit surface of the light guide plate.

The reflection plate may be provided on an edge region of the exit surface of the light guide plate where the diffractor is not provided.

The reflection plate may comprise a metal or a dielectric material.

The metal may comprise at least one of silver (Ag), gold (Au), aluminum (Al), platinum (Pt), copper (Cu), titanium (Ti), nickel (Ni), and chromium (Cr).

The backlight unit may further comprise a prism configured to adjust an angle of incidence of the light on the light guide plate, the prism being between the light source and the light guide plate.

The backlight unit may further comprise a reflection mirror provided on a surface of the prism.

The backlight unit may further comprise a collimator configured to collimate the light from the light source.

The light source may comprise a light emitting diode (LED) or a laser diode (LD).

According to another exemplary embodiment, there is provided a three-dimensional (3D) image display apparatus comprising: a light source, a light guide plate configured to guide light irradiated from the light source, and comprising an exit surface through which the light exits, a diffractor provided on the exit surface of the light guide plate and comprising gratings configured to adjust an exit direction of the light, a reflection plate provided on at least a part of the exit surface of the light guide plate and a display panel configured to form an image by using the light exited through the diffractor.

The diffractor may have an area less than an area of the exit surface of the light guide plate.

The reflection plate may be provided on an edge region of the exit surface of the light guide plate where the diffractor is not provided.

The 3D image display apparatus may have an edge of the display panel bonded to the reflection plate, or interfaces between the display panel and the reflection plate may be bonded to each other.

The reflection plate may comprise a metal or a dielectric material.

The metal may comprise at least one of silver (Ag), gold (Au), aluminum (Al), platinum (Pt), copper (Cu), titanium (Ti), nickel (Ni), and chromium (Cr).

According to another exemplary embodiment, there is provided a method of manufacturing a three-dimensional (3D) image display apparatus, the method comprising: depositing a reflection layer on a light guide plate, forming a reflection plate by etching a part of the reflection layer and remaining an edge the reflection layer, combining a diffractor with the etched part and coupling the display panel to the reflection plate.

The he reflection plate may comprise a metal or a dielectric material.

The metal may comprise at least one of silver (Ag), gold (Au), aluminum (Al), platinum (Pt), copper (Cu), titanium (Ti), nickel (Ni), and chromium (Cr).

The coupling of the display panel to the reflection plate may further comprise bonding an edge of the display panel to the reflection plate, or bonding interfaces between the display panel and the reflection plate to each other.

The forming the reflection plate may further comprise etching a center part of the reflection layer.

According to another exemplary embodiment, there is provided a backlight unit comprising: a light guide plate configured to guide a light received from a light source, a reflection plate formed on a first surface of the light guide plate through which the light exits the light guide plate towards a display panel and a diffractor formed on the first surface of the light guide plate and configured to control the light exiting the light guide plate.

The reflection plate may be provided at an area of the backlight unit configured to couple with the display panel.

The reflection plate and the diffractor may be formed on a same plane.

The reflection plate and the diffractor may be formed directly on the first surface of the light guide plate.

The reflection plate and the diffractor may be formed adjacent to each other.

The reflection plate and the diffractor may be formed without a gap in between.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings.

In the drawings, like reference numerals denote like elements and the sizes of elements may be exaggerated for clarity and convenience of explanation. It will be understood that, although the terms first, second, third, etc. may be used herein to describe various elements, these elements should not be limited by these terms. These terms are only used to distinguish one element from another.

As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated elements, but do not preclude the presence or addition of one or more other elements.

The suffix such as " . . . er", "unit", or "module" is used to denote an entity for performing at least one function or operation, and may be embodied in the form of hardware, software, or a combination thereof. "A on B" may be understood as A provided on B in a contact or noncontact manner.

Figure 1:
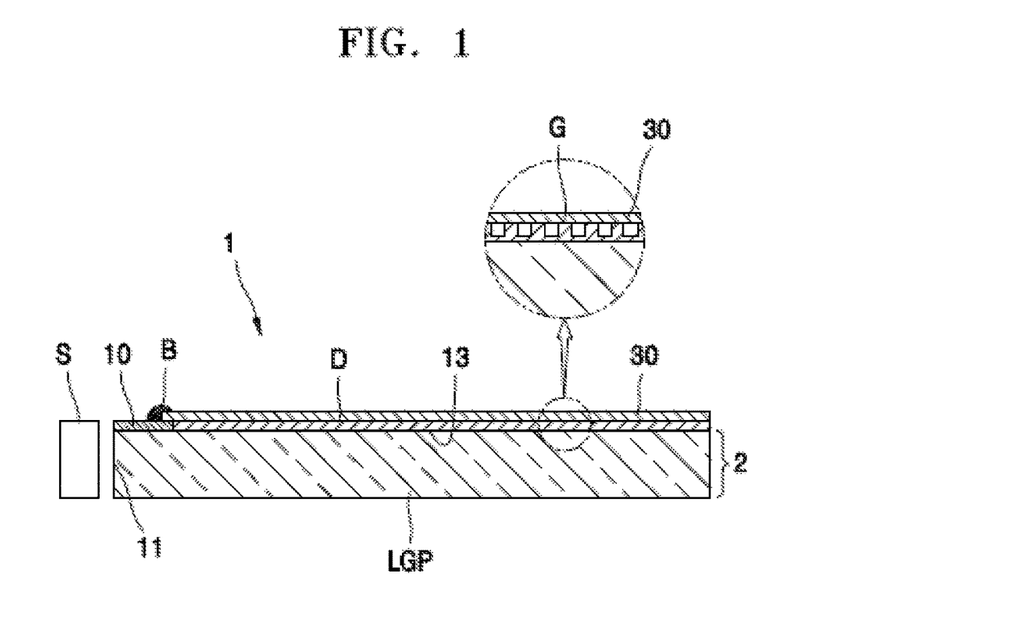
FIG. 1 is a cross-sectional view of a three-dimensional (3D) image display apparatus according to an exemplary embodiment.

FIG. 1 is a cross-sectional view of a three-dimensional (3D) image display apparatus 1 according to an exemplary embodiment. The 3D image display apparatus 1 may include a backlight unit 2, and a display panel 30 for displaying an image by using light from the backlight unit 2. The backlight unit 2 may include a light source S for irradiating light, and a light guide plate LGP for guiding light from a light source S. In an embodiment, the backlight unit 2 may include a light source S for irradiating the light guided by the light guide plate LGP. A diffractor D may be provided on the light guide plate LGP. The display panel 30 may be provided on the diffractor D. The diffractor D may include gratings G. The diffractor D may have a grating pattern (or a diffraction pattern) to control an exit direction of light based on at least one of an angle and a wavelength of light incident on the light guide plate LGP.

The light source S may be provided, for example, in at least one side direction of the light guide plate LGP. For example, the light source S may irradiate light of at least one wavelength band. For example, the light source S may include a light emitting diode (LED) or a laser diode (LD). However, the light source S is not limited thereto and any light source for irradiating light of a plurality of wavelengths may be used. A plurality of LEDs or LDs may be provided in at least one side direction of the light guide plate LGP. The light guide plate LGP may include at least one incident surface 11 on which light is incident from the light source S, and an exit surface 13 through which light proceeded in the light guide plate LGP exits. The light guide plate LGP may guide light from the light source S due to internal total reflection to exit through the exit surface 13 of the light guide plate LGP.

A reflection plate 10 may be provided on the exit surface 13 of the light guide plate LGP. In an exemplary embodiment, the reflection plate 10 may be provided on at least a part of the edge of the exit surface 13 of the light guide plate LGP. The reflection plate 10 may be made of a material capable of reflecting light. The reflection plate 10 may include a metal or a dielectric material. The reflection plate 10 may include a metal including at least one of, for example, silver (Ag), gold (Au), aluminum (Al), platinum (Pt), copper (Cu), titanium (Ti), nickel (Ni), and chromium (Cr).

The diffractor D may have an area less than that of the exit surface 13 of the light guide plate LGP. The reflection plate 10 may be provided on a region of the exit surface 13 of the light guide plate LGP where the diffractor D is not provided. Accordingly, the reflection plate 10 and the diffractor D may be provided on the same plane without a gap therebetween. For example, the reflection plate 10 may be provided on an end edge of the exit surface 13 of the light guide plate LGP. The reflection plate 10 may be provided on a region of the exit surface 13 of the light guide plate LGP close to the light source S. Alternatively, the reflection plate 10 may be provided on two side edges of the exit surface 13 of the light guide plate LGP. If necessary, the reflection plate 10 may be provided on any other region where the diffractor D is not provided.

The display panel 30 may be combined with the reflection plate 10 due to bonding B. The bonding B may be performed along the entire edge of the display panel 30. Alternatively, interfaces between the display panel 30 and the reflection plate 10 may be bonded to each other.

The reflection plate 10 and the diffractor D may be provided on the entire exit surface 13 of the light guide plate LGP, and light incident from the light source S on the light guide plate LGP may be reflected by the reflection plate 10 and proceed in the light guide plate LGP, or may be output through the diffractor D. Therefore, in an exemplary embodiment, output of light through a part other than the diffractor D may be prevented. For example, output of light through a part at the bonding B may be prevented.

Figure 2:
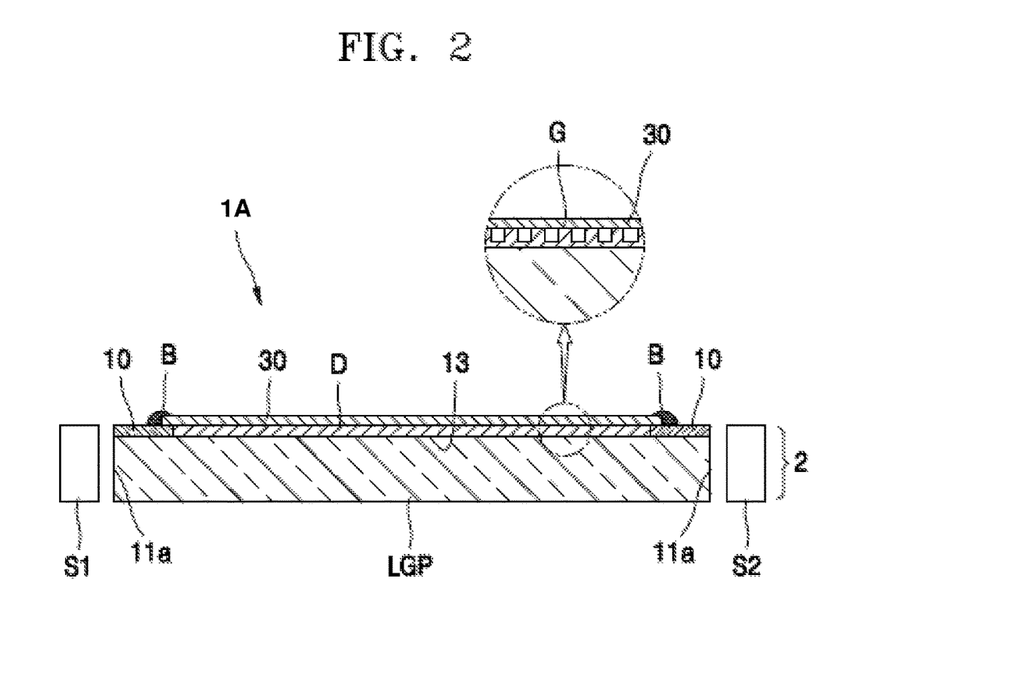
FIG. 2 is a cross-sectional view of a 3D image display apparatus according to another exemplary embodiment.

FIG. 2 is a cross-sectional view of a 3D image display apparatus 1A according to another exemplary embodiment.

The 3D image display apparatus 1A may include a backlight unit 2, and a display panel 30 for displaying an image by using light from the backlight unit. The backlight unit 2 may include a first light source S1 and a second light source S2 for irradiating light, and a light guide plate LGP for guiding light from the first and second light sources S1 and S2. A diffractor D may be provided on the light guide plate LGP. The display panel 30 may be provided on the diffractor D. The diffractor D may include gratings G. The diffractor D may have a grating pattern (or a diffraction pattern) to control an exit direction of light based on at least one of an angle and a wavelength of light incident on the light guide plate LGP. The first light source S1 may be provided at a side of the light guide plate LGP, and the second light source S2 may be provided at a position facing the first light source S1. The first light source S1 may irradiate light of a first wavelength, and the second light source S2 may irradiate light of a second wavelength. The first and second light sources S1 and S2 may include at least one LED or at least one LD.

The light guide plate LGP may include a first incident surface 11a on which light is incident from the first light source S1, a second incident surface 11b on which light is incident from the second light source S2, and an exit surface 13 through which light proceeded in the light guide plate LGP exits. The light guide plate LGP may guide light from the first and second light sources S1 and S2 due to internal total reflection to exit through the exit surface 13 of the light guide plate LGP.

A reflection plate 10 may be provided on the exit surface 13 of the light guide plate LGP. The reflection plate 10 may be provided on at least a part of the edge of the exit surface 13 of the light guide plate LGP. In FIG. 2, the reflection plate 10 may be provided at a position adjacent to the first light source S1 and a position adjacent to the second light source S2. The reflection plate 10 may be made of a material capable of reflecting light. The reflection plate 10 may include a metal or a dielectric material. The reflection plate 10 may include a metal including at least one of, for example, Ag, Au, Al, Pt, Cu, Ti, Ni, and Cr. Therefore, in another exemplary embodiment, output of light through a part other than the diffractor D may be prevented. For example, output of light through a part at the bonding B may be prevented.

Figure 3A:
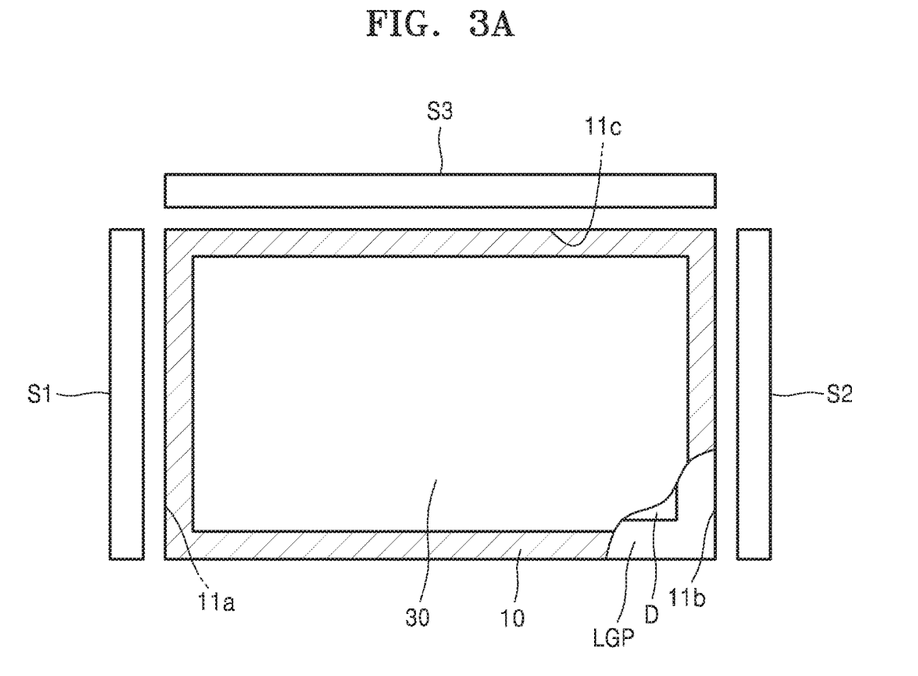
FIGS. 3A, 3B, and 3C are partially-cut plan views of 3D image display apparatuses having different light source positions according to exemplary embodiments.
Figure 3B:
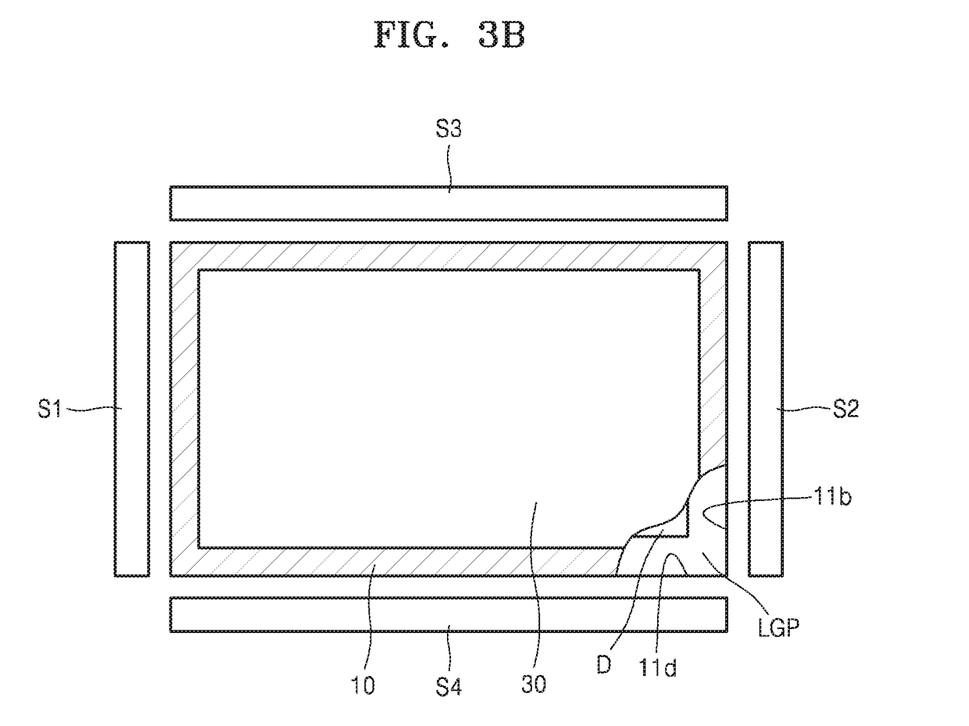
Figure 3C:
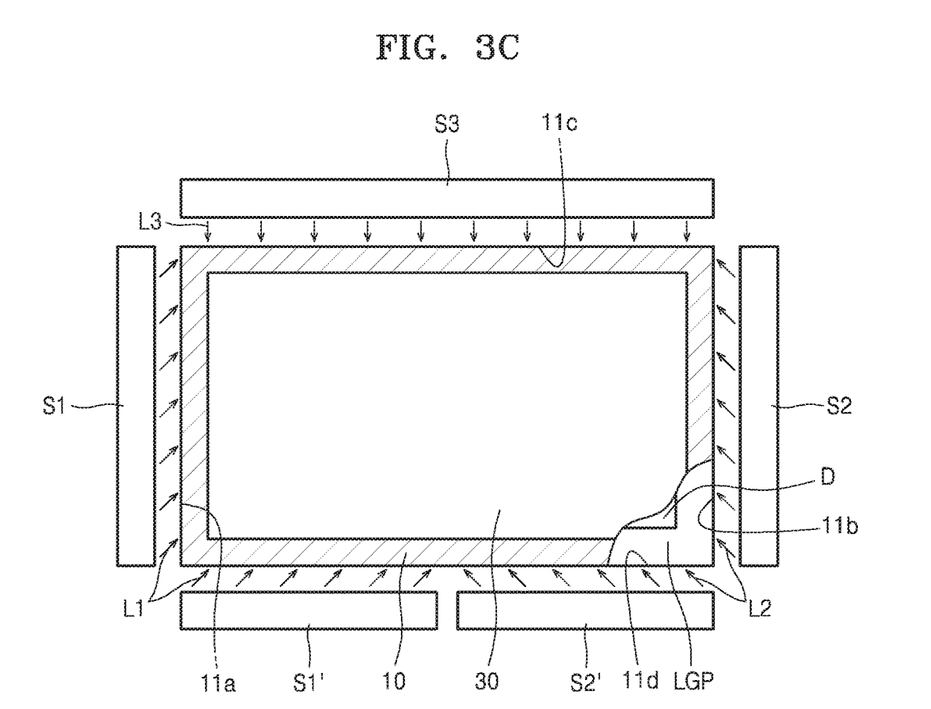

FIGS. 3A, 3B, and 3C are partially-cut plan views of 3D image display apparatuses having different light source positions according to exemplary embodiments. Referring to FIG. 3A, for example, light sources S may include a first light source S1 for irradiating light of a first wavelength band, a second light source S2 for irradiating light of a second wavelength band, and a third light source S3 for irradiating light of a third wavelength band. For example, the first light source S1 may irradiate blue light, the second light source S2 may irradiate green light, and the third light source S3 may irradiate red light. A light guide plate LGP may have, for example, a cuboid shape. The first light source S1 may be provided in a first side direction of the light guide plate LGP, the second light source S2 may be provided in a second side direction of the light guide plate LGP, and the third light source S3 may be provided in a third side direction of the light guide plate LGP. The light guide plate LGP may include a first incident surface 11a on which light is incident from the first light source S1, a second incident surface 11b on which light is incident from the second light source S2, and a third incident surface 11c on which light is incident from the third light source S3. However, light source positions are not limited thereto and may be variously changed. For example, the first, second, and third light sources S1, S2, and S3 may be arranged by turns at a side of the light guide plate LGP. Color light irradiated from the first, second, and third light sources S1, S2, and S3 may have different directions of incidence on the light guide plate LGP.

A reflection plate 10 may be provided to surround the edge of the light guide plate LGP. The reflection plate 10 and a diffractor D may be provided on an exit surface 13 of the light guide plate LGP without a gap therebetween.

FIG. 3B illustrates an example in which a first light source S1, a second light source S2, a third light source S3, and a fourth light source S4 are separately provided in four side directions of a light guide plate LGP. For example, the first light source S1 may irradiate blue light, the second light source S2 may irradiate red light, and the third light source S3 may irradiate green light. The fourth light source S4 may be a light source for irradiating light of another wavelength. Alternatively, the fourth light source S4 may be a light source for irradiating one of red light, blue light, and green light, which is more necessary. For example, the fourth light source S4 may be a light source for irradiating red light. As such, a light source having a low light efficiency may be increased in number and thus the intensity of light may be increased. The light guide plate LGP may include, for example, a first incident surface 11a on which light is incident from the first light source S1, a second incident surface 11b on which light is incident from the second light source S2, a third incident surface 11c on which light is incident from the third light source S3, and a fourth incident surface 11d on which light is incident from the fourth light source S4. In an exemplary embodiment, a reflection plate 10 may be provided to surround the edge of the light guide plate LGP. The reflection plate 10 and a diffractor D may be provided on an exit surface 13 of the light guide plate LGP without a gap therebetween.

Referring to FIG. 3C, a first light source S1 may be provided in a first side direction of a light guide plate LGP, a second light source S2 may be provided in a second side direction of the light guide plate LGP, a third light source S3 may be provided in a third side direction of the light guide plate LGP, and another first light source S1' and another second light source S2' may be further provided in a fourth side direction of the light guide plate LGP. For example, the first light sources S1 may irradiate first light L1, the second light sources S2 may irradiate second light L2, and the third light source S3 may irradiate third light L3. The first light L1 and the second light L2 may be diagonally incident on the light guide plate LGP, and the third light L3 may be perpendicularly incident on the light guide plate LGP. For example, the first light L1 irradiated from the first light source S1 provided in the first side direction of the light guide plate LGP and the first light L1 irradiated from the first light source S1' provided in the fourth side direction of the light guide plate LGP may have the same angle of incidence on the light guide plate LGP. For example, the second light L2 irradiated from the second light source S2 provided in the second side direction of the light guide plate LGP and the second light L2 irradiated from the second light source S2 provided in the fourth side direction of the light guide plate LGP may have the same angle of incidence on the light guide plate LGP. Since the first light source S1' and the second light source S2' are further provided in the fourth side direction, the intensities of the first light L1 and the second light L2 may be increased as necessary. In addition, for example, the numbers and positions of light sources may be variously changed. When the first and second light sources S1' and S2' are provided in the fourth side direction, the first and second light sources S1' and S2' may be provided by turns. The first light L1, the second light L2, and the third light L3 irradiated from the first, second, and third light sources S1, S2, and S3 may have different directions of incidence on the light guide plate LGP.

A reflection plate 10 and a diffractor D may be provided on an exit surface 13 of the light guide plate LGP without a gap therebetween.

Figure 4:
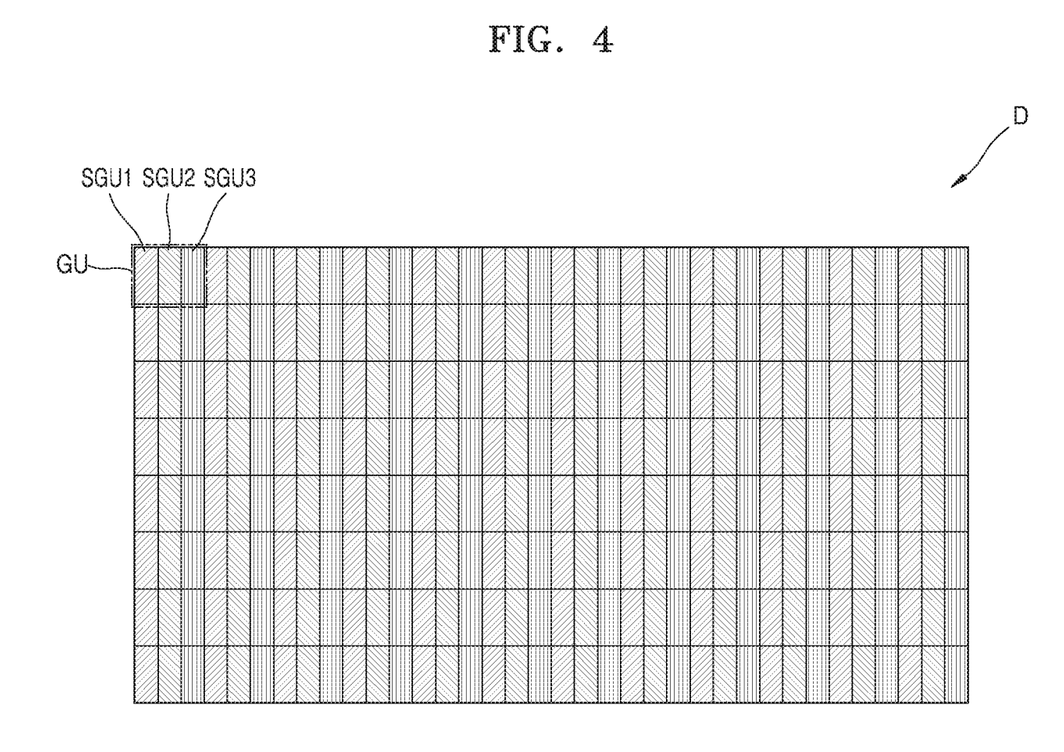
FIG. 4 illustrates a diffractor of a directional backlight unit according to an exemplary embodiment.

FIG. 4 illustrates a diffractor D. The diffractor D may include gratings G. The diffractor D may have a grating pattern (or a diffraction pattern) to control an exit direction of light based on at least one of an angle and a wavelength of light incident on the light guide plate LGP. For example, the angle of light incident on the light guide plate LGP may correspond to the exit direction of light from the light guide plate LGP. The diffractor D may be configured to have selectivity in the wavelength of light. In other words, the diffractor D may include a grating pattern configured to respond to light of only a specific wavelength band.

The diffractor D may have a plurality of grating pattern sets corresponding to at least one of, for example, a direction and a wavelength of light incident from the light guide plate LGP on the diffractor D. The diffractor D may enable interaction between the gratings G and light of a specific wavelength, and allows light to exit in a specific direction based on a combination of, for example, a pitch of the gratings G, an arrangement direction of the gratings G, a refractive index of the gratings G, a duty cycle of the gratings G, and a relative angle between a proceeding direction of light and the gratings G.

FIG. 4 illustrates the grating pattern of the diffractor D. The diffractor D may include a plurality of grating units GU. Each grating unit GU may include a plurality of sub grating units dependent upon wavelengths of light. The grating unit GU may include a grating pattern corresponding to a pixel of the display panel 30. The pixel may be, for example, a unit capable of controlling transmittance of light. Each sub grating unit may include a grating pattern corresponding to a sub pixel of the display panel 30. The sub pixel may be a unit capable of controlling transmittance of light and selecting a wavelength of light.

The grating unit GU may include a first sub grating unit SGU1, a second sub grating unit SGU2, and a third sub grating unit SGU3. For example, the first sub grating unit SGU1 may respond to light of a first wavelength, the second sub grating unit SGU2 may respond to light of a second wavelength, and the third sub grating unit SGU3 may respond to light of a third wavelength.

The diffractor D may allow light to exit in different directions based on the grating pattern sets. The light exited in different directions may provide different views and thus a 3D image may be displayed. Herein, a view may refer to, for example, an image provided to an eye of a user. However, in an exemplary embodiment is not limited thereto and images corresponding to two or more views may be provided to an eye of the user. The diffractor D may control exit directions of light, and a 3D image may be displayed when different views are provided to the user based on the exit directions of light. Based on the number of grating pattern sets, a plurality of views, e.g., 36, 48, or 96 views, may be provided.

Figure 5:
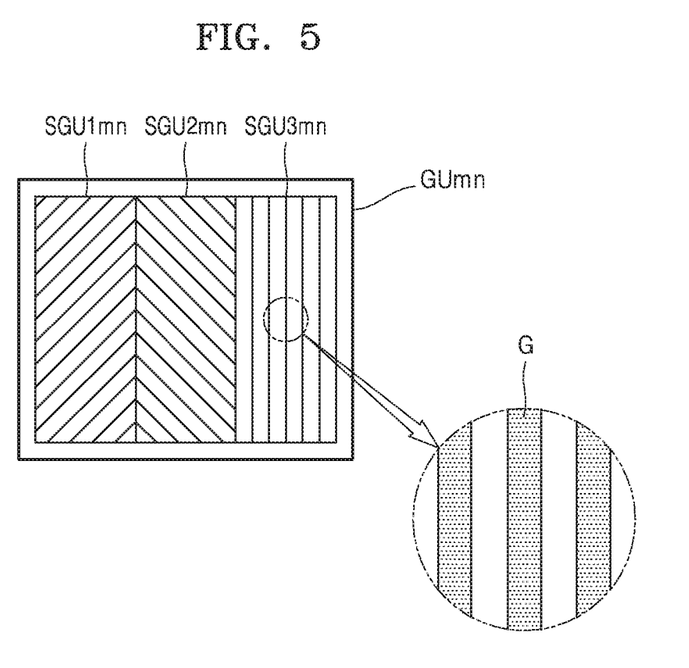
FIG. 5 is a magnified view of a grating unit of the diffractor illustrated in FIG. 4 according to an exemplary embodiment.

FIG. 5 is a magnified view of a grating unit GUmn of the diffractor D illustrated in FIG. 4. In the diffractor D, for example, a plurality of grating units GUmn may be arranged in a two-dimensional (2D) matrix. In GUmn, m and n may indicate a row and a column, respectively. Each grating unit GUmm may include, for example, a first sub grating unit SGU1$mn$, a second sub grating unit SGU2$mn$, and a third sub grating unit SGU3$mn$. The first, second, and third sub grating units SGU1$mn$, SGU2$mn$, and SGU3$mn$ may include different grating patterns. The first, second, and third sub grating units SGU1$mn$, SGU2$mn$, and SGU3$mn$ may have the same area. Alternatively, the first, second, and third sub grating units SGU1$mn$, SGU2$mn$, and SGU3$mn$ may have different areas, and may have different diffraction efficiencies based on the areas thereof.

Figure 6:
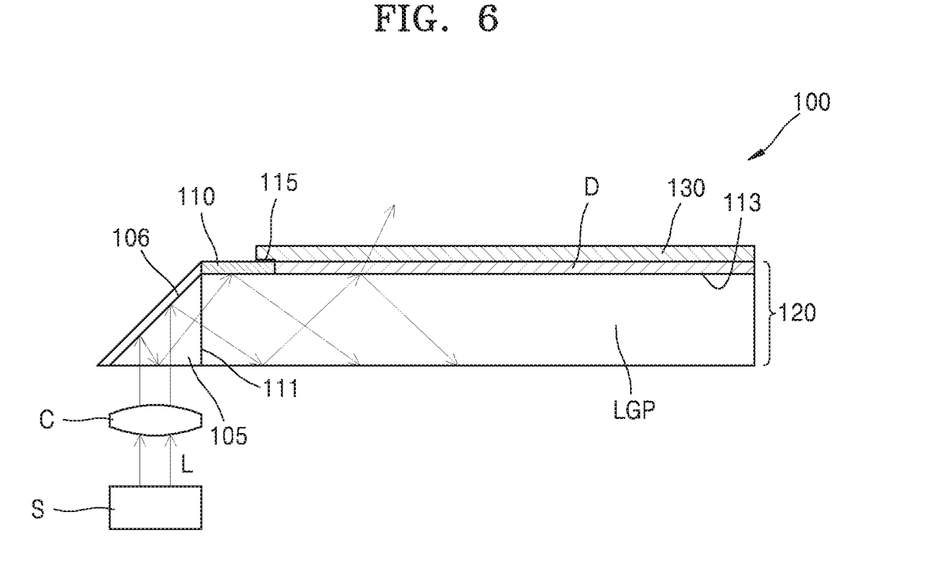
FIG. 6 is a cross-sectional view of a 3D image display apparatus according to another exemplary embodiment.

FIG. 6 is a cross-sectional view of a 3D image display apparatus 100 according to another exemplary embodiment. The 3D image display apparatus 100 may include a backlight unit 120, and a display panel 130 for displaying an image by using light from the backlight unit. The backlight unit may include a light source S for irradiating light, and a light guide plate LGP for guiding light from the light source S. A diffractor D may be provided on the light guide plate LGP. The display panel 130 may be provided on the diffractor D. A prism 105 may be further provided at a side of the light guide plate LGP. A reflection mirror 106 may be provided on the prism 105. Light L irradiated from the light source S may be reflected by the reflection mirror 106 through the prism 105 and incident on the light guide plate LGP.

A collimator C for collimating light may be further provided between the light source S and the prism 105. The collimator C may include, for example, a lens. The prism 105 may allow the collimated light to be maintained in the collimated state and reflected by the reflection mirror 106. The collimated light may have a constant angle of incidence on the light guide plate LGP. The prism 105 and the reflection mirror 106 may have a variety of structures capable of adjusting and maintaining the angle of incidence of light on the light guide plate LGP.

The light source S may irradiate light of at least one wavelength band. For example, the light source S may include an LED or an LD. However, the light source S is not limited thereto and any light source for irradiating light of a plurality of wavelengths may be used. The light guide plate LGP may include at least one incident surface 111 on which the light L is incident from the light source S, and an exit surface 113 through which light proceeded in the light guide plate LGP exits. The light guide plate LGP may guide light from the light source S due to internal total reflection to exit through the exit surface 113 of the light guide plate LGP.

A reflection plate 110 may be provided on a part of the exit surface 113 of the light guide plate LGP. The reflection plate 110 may be provided on at least a part of the edge of the exit surface 113 of the light guide plate LGP. The reflection plate 110 may be made of a material capable of reflecting light. The reflection plate 110 may include a metal or a dielectric material. The reflection plate 110 may include a metal including at least one of, for example, Ag, Au, Al, Pt, Cu, Ti, Ni, and Cr.

The diffractor D may have an area less than that of the exit surface 113 of the light guide plate LGP. The reflection plate 110 may be provided on a region of the exit surface 113 of the light guide plate LGP where the diffractor D is not provided. Accordingly, the reflection plate 110 and the diffractor D may be provided on the same plane without a gap therebetween. For example, the reflection plate 110 may be provided on an end edge of the exit surface 113 of the light guide plate LGP. The reflection plate 110 may be provided on a region of the exit surface 113 of the light guide plate LGP close to the incident surface 111. Alternatively, the reflection plate 110 may be provided on two side edges of the exit surface 113 of the light guide plate LGP. If necessary, the reflection plate 110 may be provided on any other region where the diffractor D is not provided.

The display panel 130 may be combined with the reflection plate 110 by a bonding layer 115. The bonding layer 115 may be provided on interfaces between the display panel 130 and the reflection plate 110.

The reflection plate 110 and the diffractor D may be provided on the entire exit surface 113 of the light guide plate LGP, and light incident from the light source S on the light guide plate LGP may be reflected by the reflection plate 110 and proceed in the light guide plate LGP, or may be output through the diffractor D. Therefore, in an exemplary embodiment, output of light through a part other than the diffractor D may be prevented. For example, output of light through a part at the bonding B may be prevented. In addition, since light collimated by the collimator C is maintained in the collimated state and incident on the light guide plate LGP through the prism 105, an angle of incidence of light on the light guide plate LGP may be adjusted. As such, the diffractor D may diffract light in a desired direction based on the angle of incidence of light on the light guide plate LGP.

Figure 7:
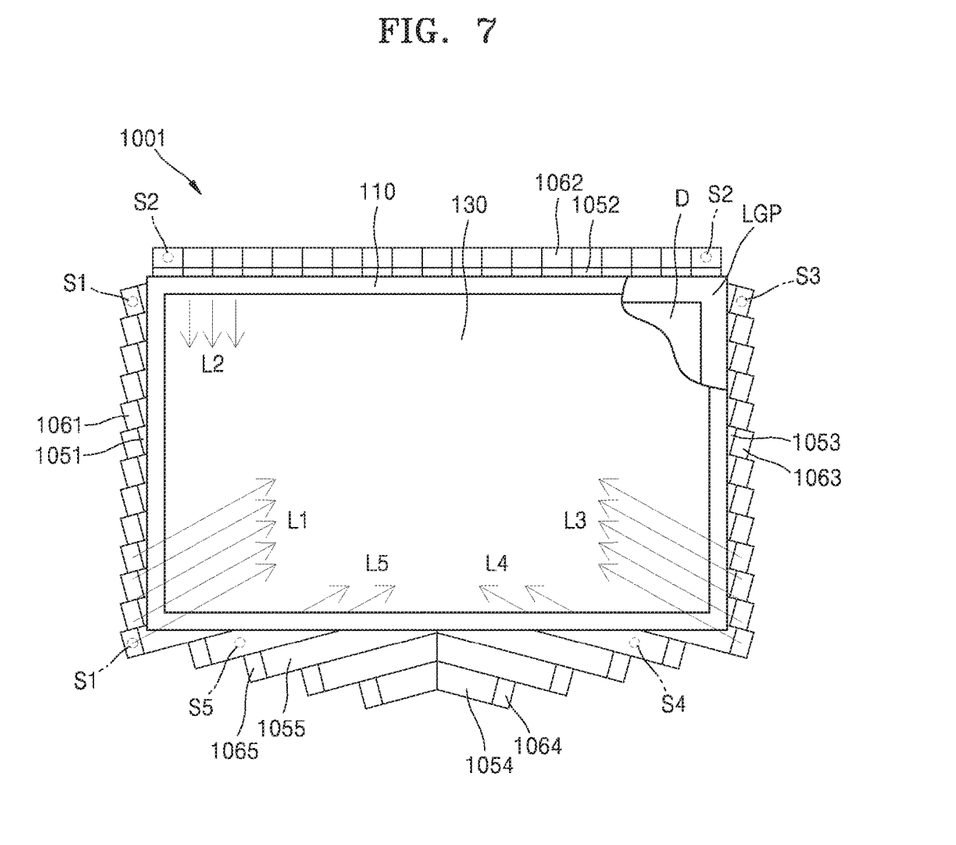
FIG. 7 is a partially-cut plan view of a 3D image display apparatus according to another exemplary embodiment.

FIG. 7 is a partially-cut plan view of a 3D image display apparatus 1001 according to another exemplary embodiment. The 3D image display apparatus 1001 uses light of a plurality of wavelengths.

First prisms 1051 and first reflection mirrors 1061 may be provided in a first side direction of a light guide plate LGP, second prisms 1052 and second reflection mirrors 1062 may be provided in a second side direction of the light guide plate LGP, and third prisms 1053 and third reflection mirrors 1063 may be provided in a third side direction of the light guide plate LGP. Fourth prisms 1054 and fourth reflection mirrors 1064 may be further provided in a part of a fourth side direction of the light guide plate LGP, and fifth prisms 1055 and fifth reflection mirrors 1065 may be further provided in another part of the fourth side direction of the light guide plate LGP.

First light sources S1 may be provided below the first prisms 1051, second light sources S2 may be provided below the second prisms 1052, and third light sources S3 may be provided below the third prisms 1053. Fourth light sources S4 may be provided below the fourth prisms 1054, and fifth light sources S5 may be provided below the fifth prisms 1055. In FIG. 7, for convenience, only some light sources are indicated by virtual circles. Positions of prisms and reflection mirrors may vary based on desired directions of incident of light on the light guide plate LGP.

A reflection plate 110 may be provided on a part of the light guide plate LGP. The reflection plate 110 may be provided on a region of an exit surface of the light guide plate LGP where a diffractor D is not provided. The reflection plate 110 and the diffractor D may be provided on the same plane without a gap therebetween. A display panel 130 may cover the diffractor D and be coupled to the reflection plate 110.

The reflection plate 110 and the diffractor D may be provided on the entire exit surface of the light guide plate LGP, and light incident from each light source on the light guide plate LGP may be reflected by the reflection plate 110 and proceed in the light guide plate LGP, or may be reflected by the diffractor D, proceed in the light guide plate LGP, and be output through the diffractor D. Therefore, in an exemplary embodiment, light may be output to the outside through the light guide plate LGP and the diffractor D without being leaked.

For example, the first light sources S1 may irradiate first light L1 of a first wavelength, the second light sources S2 may irradiate second light L2 of a second wavelength, and the third light sources S3 may irradiate third light L3 of a third wavelength. The first light L1 and the third light L3 may be diagonally incident on the light guide plate LGP, and the second light L2 may be perpendicularly incident on the light guide plate LGP.

The fourth light sources S4 may irradiate fourth light L4 of the third wavelength. The fifth light sources S5 may irradiate fifth light L5 of the first wavelength. As described above, the number of light sources may be adjusted to increase the intensity of light as necessary. The fourth light L4 may be incident on the light guide plate LGP in a direction parallel to the third light L3. The fifth light L5 may be incident on the light guide plate LGP in a direction parallel to the first light L1. As such, the diffractor D may output light in desired directions based on angles of incidence of light on the light guide plate LGP. Prism shapes and reflection mirror positions may be changed to adjust the angles of incidence of light on the light guide plate LGP.

In an exemplary embodiment, since light sources for required wavelengths are further provided, the intensities of light may be increased as necessary. In addition, for example, the numbers and positions of light sources may be variously changed.

FIGS. 8 to 11 are cross-sectional views for describing a method of manufacturing a 3D image display apparatus, according to an exemplary embodiment.

Figure 8:
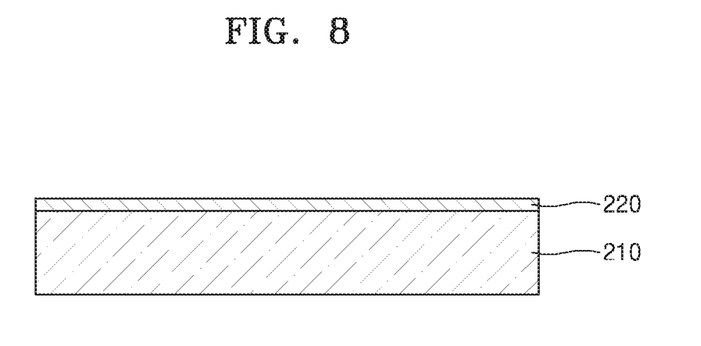
FIGS. 8 to 11 are cross-sectional views for describing a method of manufacturing a 3D image display apparatus according to an exemplary embodiment.

Referring to FIG. 8, a reflection layer 220 may be deposited on a light guide plate 210. The reflection layer 220 may include a metal or a dielectric material. The metal may include at least one of Ag, Au, Al, Pt, Cu, Ti, Ni, and Cr.

Figure 9:
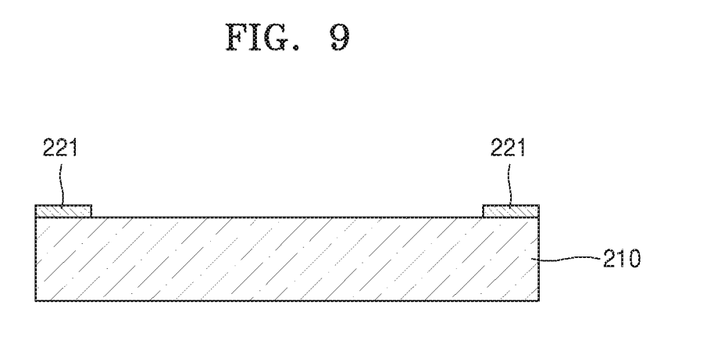

Referring to FIG. 9, a reflection plate 221 may be formed by etching a center part of the reflection layer 220 and remaining the edge of the reflection layer 220. The reflection plate 221 may be formed in a desired shape by using a mask (not shown). Although the reflection plate 221 is formed at the edge of the light guide plate 210 in the above description, the reflection plate 221 is not limited thereto and may be formed in a variety of shapes.

Figure 10:
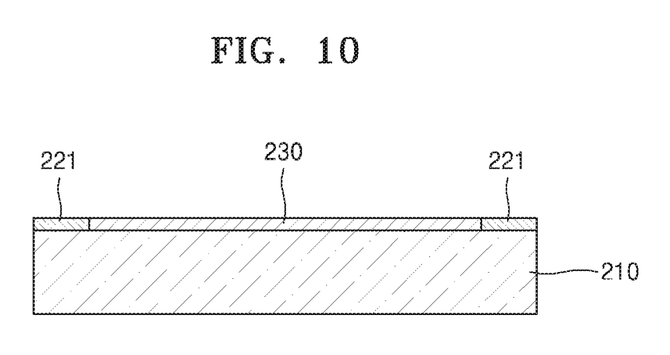
Figure 11:
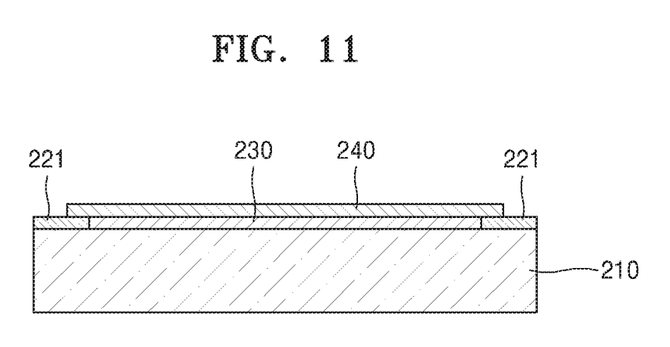

Referring to FIG. 10, a diffractor 230 may be stacked on a region of the light guide plate 210 where the reflection plate 221 is not provided. Referring to FIG. 11, a display panel 240 may be coupled to the reflection plate 221 and provided on the diffractor 230. When the display panel 240 is coupled to the reflection plate 221, the edge of the display panel 240 may be bonded to the reflection plate 221, or interfaces between the display panel 240 and the reflection plate 221 may be bonded to each other. As such, the display panel 240 may be uniformly coupled to the reflection plate 221 along the edge of the reflection plate 221. Accordingly, the display panel 240 may be uniformly combined with the diffractor D, and thus errors in an exit direction of light through the diffractor D may be reduced. For instant, light exiting the light guide plate at other than through the diffractor D may be reduced.

A directional backlight unit according to an exemplary embodiment may include a reflection plate on the edge of an exit surface of the backlight unit and thus reduce light leakage. In addition, the backlight unit and a display panel may be uniformly combined with each other. Therefore, a 3D image display apparatus having a good image quality may be provided using the directional backlight unit according to an embodiment. In a method of manufacturing the 3D image display apparatus, according to an embodiment, the backlight unit and the display panel may be uniformly combined with each other.

It should be understood that exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A backlight unit comprising:
    a light source;
    a light guide plate configured to guide light irradiated from the light source, and comprising an exit surface through which the light exits;
    a reflection plate provided on at least a part of an edge of the exit surface of the light guide plate, the reflection plate being different from the light guide plate and the reflection plate being separately formed on the light guide plate;
    a diffractor provided on the exit surface of the light guide plate,
    wherein the diffractor has an area that is less than an area of the exit surface of the light guide plate, and
    wherein the reflection plate is provided on an edge region of the exit surface of the light guide plate where the diffractor is not provided.

2. The backlight unit of claim 1, wherein the reflection plate comprises a metal or a dielectric material.

3. The backlight unit of claim 2, wherein the metal comprises at least one of silver (Ag), gold (Au), aluminum (Al), platinum (Pt), copper (Cu), titanium (Ti), nickel (Ni), and chromium (Cr).

4. The backlight unit of claim 1, further comprising a prism configured to adjust an angle of incidence of the light on the light guide plate, the prism being between the light source and the light guide plate.

5. The backlight unit of claim 4, further comprising a reflection mirror provided on a surface of the prism.

6. The backlight unit of claim 1, further comprising a collimator configured to collimate the light from the light source.

7. The backlight unit of claim 1, wherein the light source comprises a light emitting diode (LED) or a laser diode (LD).

8. The backlight unit of claim 1, wherein an entire portion of the reflection plate and an entire portion of the diffractor are formed on the same plane in a horizontal direction.

9. The backlight unit of claim 8, wherein the reflection plate is provided on a surface of the light guide only between a periphery of the light guide and the diffractor.

10. A three-dimensional (3D) image display apparatus comprising:
    a light source;
    a light guide plate configured to guide light irradiated from the light source, and comprising an exit surface through which the light exits;
    a diffractor provided on the exit surface of the light guide plate and comprising gratings configured to adjust an exit direction of the light;
    a reflection plate provided on at least a part of an edge of the exit surface of the light guide plate, the reflection plate being different from the light guide plate and the reflection plate being separately formed on the light guide plate; and
    a display panel configured to form an image by using the light exited through the diffractor,
    wherein the diffractor has an area less than an area of the exit surface of the light guide plate, and
    wherein the reflection plate is provided on an edge region of the exit surface of the light guide plate where the diffractor is not provided.

11. The 3D image display apparatus of claim 10, wherein an edge of the display panel is bonded to the reflection plate, or interfaces between the display panel and the reflection plate are bonded to each other.

12. The 3D image display apparatus of claim 10, wherein the reflection plate comprises a metal or a dielectric material.

13. The 3D image display apparatus of claim 12, wherein the metal comprises at least one of silver (Ag), gold (Au), aluminum (Al), platinum (Pt), copper (Cu), titanium (Ti), nickel (Ni), and chromium (Cr).

14. A method of manufacturing a three-dimensional (3D) image display apparatus, the method comprising:
    depositing a reflection layer on a light guide plate;
    forming a reflection plate by etching a part of the reflection layer and remaining an edge the reflection layer, the reflection plate being different from the light guide plate and the reflection plate being separately formed on the light guide plate;
    combining a diffractor having an area less than an area of an exit surface of the light guide plate with the etched part;
    coupling a display panel to the reflection plate; and
    providing the reflection plate on an edge region of the exit surface of the light guide plate where the diffractor is not provided.

15. The method of claim 14, wherein the reflection plate comprises a metal or a dielectric material.

16. The method of claim 15, wherein the metal comprises at least one of silver (Ag), gold (Au), aluminum (Al), platinum (Pt), copper (Cu), titanium (Ti), nickel (Ni), and chromium (Cr).

17. The method of claim 14, wherein the coupling of the display panel to the reflection plate comprises bonding an edge of the display panel to the reflection plate, or bonding interfaces between the display panel and the reflection plate to each other.

18. The method of claim 14, wherein the forming the reflection plate further comprises etching a center part of the reflection layer.

19. The method of claim 14, wherein the reflection plate is provided on a surface of the light guide only in the vicinity of a bonding portion to prevent the light from exiting the light guide through the surface of the light guide at the bonding portion.

20. A backlight unit comprising:
a light guide plate configured to guide a light received from a light source;
a reflection plate formed on a first surface of the light guide plate through which the light exits the light guide plate towards a display panel, the reflection plate being different from the light guide plate and the reflection plate being separately formed on the light guide plate; and
a diffractor formed on the first surface of the light guide plate and configured to control the light exiting the light guide plate,
wherein the diffractor has an area less than an area of an exit surface of the light guide plate, and
wherein the reflection plate is provided on an edge region of the exit surface of the light guide plate where the diffractor is not provided.

21. The backlight unit of claim 20, wherein the reflection plate is provided at an area of the backlight unit configured to couple with the display panel.

22. The backlight unit of claim 20, wherein the reflection plate and the diffractor are formed on a same plane.

23. The backlight unit of claim 20, wherein the reflection plate and the diffractor are formed directly on the first surface of the light guide plate.

24. The backlight unit of claim 23, wherein the reflection plate and the diffractor are formed adjacent to each other.

25. The backlight unit of claim 23, wherein the reflection plate and the diffractor are formed without a gap in between.

* * * * *